United States Patent
Kim et al.

(10) Patent No.: US 6,650,469 B2
(45) Date of Patent: Nov. 18, 2003

(54) OBJECTIVE LENS FORMED OF A SINGLE LENS AND HAVING HIGH NUMERICAL APERTURE AND AN OPTICAL PICKUP APPARATUS ADOPTING THE SAME

(75) Inventors: Dae-sik Kim, Gyeonggi-do (KR); Chul-woo Lee, Seoul (KR); Seung-tae Jung, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/074,249

(22) Filed: Feb. 14, 2002

(65) Prior Publication Data

US 2003/0035225 A1 Feb. 20, 2003

(30) Foreign Application Priority Data

Jul. 26, 2001 (KR) .......................................... 2001-45219

(51) Int. Cl.[7] .................. G02B 23/00; G02B 13/18; G02B 3/02
(52) U.S. Cl. ........................ 359/363; 359/719
(58) Field of Search ................... 359/719, 363

(56) References Cited

U.S. PATENT DOCUMENTS

| | | | | |
|---|---|---|---|---|
| 4,296,316 A | * | 10/1981 | Tsuji et al. ............. | 250/204 |
| 4,820,029 A | * | 4/1989 | Iwai et al. ............. | 359/719 |
| 4,979,807 A | * | 12/1990 | Matsuoka ............. | 359/708 |
| 5,206,852 A | * | 4/1993 | Kim et al. ............. | 369/112.18 |
| 5,317,556 A | * | 5/1994 | Tsuboi et al. ......... | 369/112.19 |
| 5,533,001 A | * | 7/1996 | Watanabe et al. ..... | 369/275.2 |
| 5,768,031 A | * | 6/1998 | Yang ..................... | 359/708 |
| 6,058,095 A | | 5/2000 | Yamamoto et al. .... | 369/112 |

FOREIGN PATENT DOCUMENTS

JP     10-123410     5/1998

* cited by examiner

*Primary Examiner*—Hung Xuan Dang
*Assistant Examiner*—Joseph Martinez
(74) *Attorney, Agent, or Firm*—Staas & Halsey LLP

(57) ABSTRACT

An optical pickup apparatus having an objective lens which is formed of a single lens such that the maximum slope angle of a surface of the lens is less than 55° with respect to a high NA of 0.7 or more. The objective lens can be manufactured to satisfy a condition of allowance in optical aberration and have a high NA of 0.7 or more unlike a typical objective lens formed of a single lens. Also, the optical pickup apparatus adopting the objective lens can be used for high density recording and reproduction and provide a reduced volume, a simple structure, and/or a low price. Also, since the optical pickup apparatus adopting the objective lens has a very short working distance, the first reflection surface recording method can be adopted. Accordingly, the thickness of the optical pickup apparatus can be manufactured as thin as a protective layer of a typical recording medium.

48 Claims, 7 Drawing Sheets

OBJECTIVE LENS FORMED OF A SINGLE LENS AND HAVING HIGH NUMERICAL APERTURE AND AN OPTICAL PICKUP APPARATUS ADOPTING THE SAME

CROSS-REFERENCE TO RELATED APPLICATIONS

This application claims the benefit of Korean Patent Application No. 2001-45219 filed on Jul. 26, 2001, in the Korean Industrial Property Office, the disclosure of which is incorporated herein by reference.

BACKGROUND OF THE INVENTION

1. Field of the Invention

The present invention relates to an objective lens formed of a single lens and having a high NA (numerical aperture) which has an improved structure to overcome limitations of a conventional objective lens formed of a single lens, and an optical pickup apparatus adopting the same.

2. Description of the Related Art

To increase density in recording information on a recording medium, the size of a light spot formed on the recording medium to record and/or reproduce data needs to be reduced. The size of a light spot is proportional to a wavelength $\lambda$ of light in use, as shown in Mathematical Formula 1, and inversely proportional to the size of NA of an objective lens. Thus, as the NA of the objective lens increases, the recording density increases.

Mathematical Formula 1

$$\text{Size of light spot} \propto \lambda/NA$$

However, due to limitations in manufacturing, it is difficult to provide an objective lens formed of a single lens having a high NA, for example, 0.7 or more, while satisfying an allowance condition of optical aberration (when slope angle<55° and optical path difference (OPD)=0.03$\lambda$ rms, decenter>4 $\mu$m and tilt>2 arcmin). This is because of a restricted material of a lens and because a spherical shape of the lens is designed such that it is inappropriate for injection. That is, an objective lens having a short focal length and a high NA and formed of a single lens has a large curvature of a spherical surface so that an angle of a tangent at an effective surface becomes 55° or more. This slope angle makes the manufacturing of a mold difficult and decreases a degree of allowance in decentering between lens surfaces during manufacturing of a lens, thus lowering production yield.

Thus, an objective lens having a high NA and which is easy to manufacture and to secure allowance in assembly is needed. Also, as the NA increases, since an effect by wavefront aberration according to a thickness of a recording medium increases, the thickness of a recording medium, that is, the thickness of a protective layer to protect a recording surface, is required to be thin.

As is well known in the field to which the present invention pertains, DVDs (digital versatile disc) have a protective layer having a thickness of 0.6 mm to protect a recording surface of a recording medium. When a protective layer is thick, as in a DVD, a working distance (WD) between an objective lens and a recording medium must be sufficient. Accordingly, the thickness of a protective layer restricts an increase of NA of the objective lens needed to miniaturize the objective lens formed of a single lens and to provide high density recording. In order to manufacture an objective lens having a small diameter and a sufficient WD to prevent the objective lens from contacting a recording medium, a curvature of a spherical surface increases while allowances in eccentricity and angle of view between surfaces of the lens decreases, so that productivity deteriorates.

An objective lens formed of two lenses, as illustrated in FIG. 1, has been suggested by Japanese Patent Publication No. 10-123410 to satisfy a need for the thickness of a thin protective layer and overcome the limitations on the objective lens formed of a single lens.

Referring to FIG. 1, a conventional objective lens 10 includes a first lens 11 to condense incident light and a second lens 13 disposed between the first lens 11 and the recording medium 1 to increase an NA of the objective lens 10. When a red wavelength, for example, light having a wavelength of 635 nm, is used to secure assembly allowance, curvature is assigned to four divided lens surfaces so that a high NA of 0.7 or more can be achieved.

The objective lens 10 includes at least one aspheric surface and uses a low dispersion material to reduce chromatism. An NA of 0.7 or more can be achieved by using a low dispersion material exhibiting an Abbe's number of 40 or more in line d and an NA of 0.8 or more can be achieved by using a low dispersion material exhibiting an Abbe's number of 60 or more.

Given that the focal length of the first lens 11 disposed at a position where light is incident is f1 and the synthesized focal length of two lenses 11 and 13, that is, the overall focal length of the objective lens 10, is f, the objective lens 10 provides that 1.7<f1/f<2.5.

Also, when a thickness T of a transparent protective layer to protect a recording surface with respect to NA satisfies conditions of Inequalities 2 below, the objective lens 10 enables correction of aberration.

Inequalities 2

When 0.7<NA<0.8, T$\leq$0.32 mm;

When 0.8$\leq$NA$\leq$0.9, T$\leq$0.20 mm; and

When 0.9$\leq$NA, T$\leq$0.11 mm.

Also, when a refractive index of a lens having a relatively large curvature of a lens surface of two lenses 11 and 13 is n1 and a reflective index of a lens having a relatively small curvature is n2, the objective lens 10 satisfies n1>n2.

Also, when the diameter and the working distance of an incident light beam are BW and WD', respectively, the objective lens 10 provides that 1.0$\leq$BW<4.5 and 0.05$\leq$WD. The BW and WD' satisfy conditions of Inequalities 3 below with respect to the NA of the objective lens 10.

Inequalities 3

When 0.7<NA<0.8, $WD' \leq 0.25676BW+0.039189$;

When 0.8<NA<0.9, $WD' \leq 0.14054BW-0.064865$; and

When 0.9<NA, $WD' \leq 0.096429BW-0.244640$.

The conventional objective lens 10 can realize a high NA of 0.8 or more with respect to a recording medium having a protective layer thinner than that of a DVD. Also, the objective lens 10, which is formed of two lenses 11 and 13, can satisfy the condition of a thin protective layer and simultaneously overcome the limitation on the objective lens formed of a single lens.

However, the conventional objective lens 10 formed of two lenses needs a holder to maintain a distance between the two lenses 11 and 13, that is, an air gap, to be constant. Thus, since the conventional objective lens 10 has a high NA, allowances in distance and angle between the two lenses 11 and 13 are too small during assembly of the holder, so that production yield is deteriorated. Furthermore, since an actuator to control focus by driving the two lenses 11 and 13 being integrated is needed, a recording/reproducing apparatus is complicated and large.

SUMMARY OF THE INVENTION

Accordingly, it is an object of the present invention to provide an objective lens having a high NA and formed of a single lens which has an improved structure so that the limitations on the conventional objective lens formed of a single lens and the problems of the conventional objective lens formed of two lenses are overcome, and an optical pickup apparatus adopting the objective lens.

Additional objects and advantages of the invention will be set forth in part in the description which follows and, in part, will be obvious from the description, or may be learned by practice of the invention.

The foregoing and other objects of the present invention are achieved by providing an objective lens formed of a single lens, wherein a working distance of the lens is less than a thickness at the center of the lens.

The foregoing and other objects of the present invention may also be achieved by providing an objective lens formed of a single lens, wherein a thickness at the center of the lens is 0.8 times or more an effective diameter of the lens.

The foregoing and other objects of the present invention may also be achieved by providing an optical pickup apparatus comprising a light source to generate and emit a light beam having a predetermined wavelength, an objective lens to focus the light beam emitted from the light source to form a light spot on a recording surface of a recording medium, and a photodetector to receive the light beam reflected by the recording surface of the recording medium, wherein the objective lens is formed of a single lens and a working distance of the objective lens is less than a thickness at the center of the objective lens.

The foregoing and other objects of the present invention may also be achieved by providing an optical pickup apparatus comprising a light source to generate and emit a light beam having a predetermined wavelength, an objective lens to focus the light beam emitted from the light source to form a light spot on a recording surface of a recording medium, and a photodetector to receive the light beam reflected by the recording surface of the recording medium, wherein the objective lens is formed of a single lens and a thickness at the center of the objective lens is 0.8 times or more than an effective diameter of the objective lens.

An embodiment of the present invention provides that when an NA of the objective lens is 0.8 or more, a working distance of the objective lens satisfies the following Inequality:

$$WD \leq \alpha BW - 0.2T,$$

wherein WD is a working distance, BW is a diameter of an incident light beam, T is a thickness at the center of the objective lens, $\alpha=1/(2 \tan \theta)$, and $\theta=\text{Arcsin}(NA)$.

An embodiment of the present invention also provides that the recording medium has a structure adopting a first reflection surface recording method, and that a protective layer of the recording medium has a thickness in a range of 40 nm–100 μm.

An embodiment of the present invention also provides that the optical pickup apparatus further comprises a reflection type compound prism formed of a plurality of prisms to make an incident light beam emitted from the light source proceed by reducing the size of the light beam in a direction of height by using a difference in angle between surfaces of the prisms, and the light beam reflected by a surface forming an angle less than 45° with respect to a horizontal plane which is perpendicular to the direction of height, so as to proceed toward the objective lens disposed in the direction of height.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
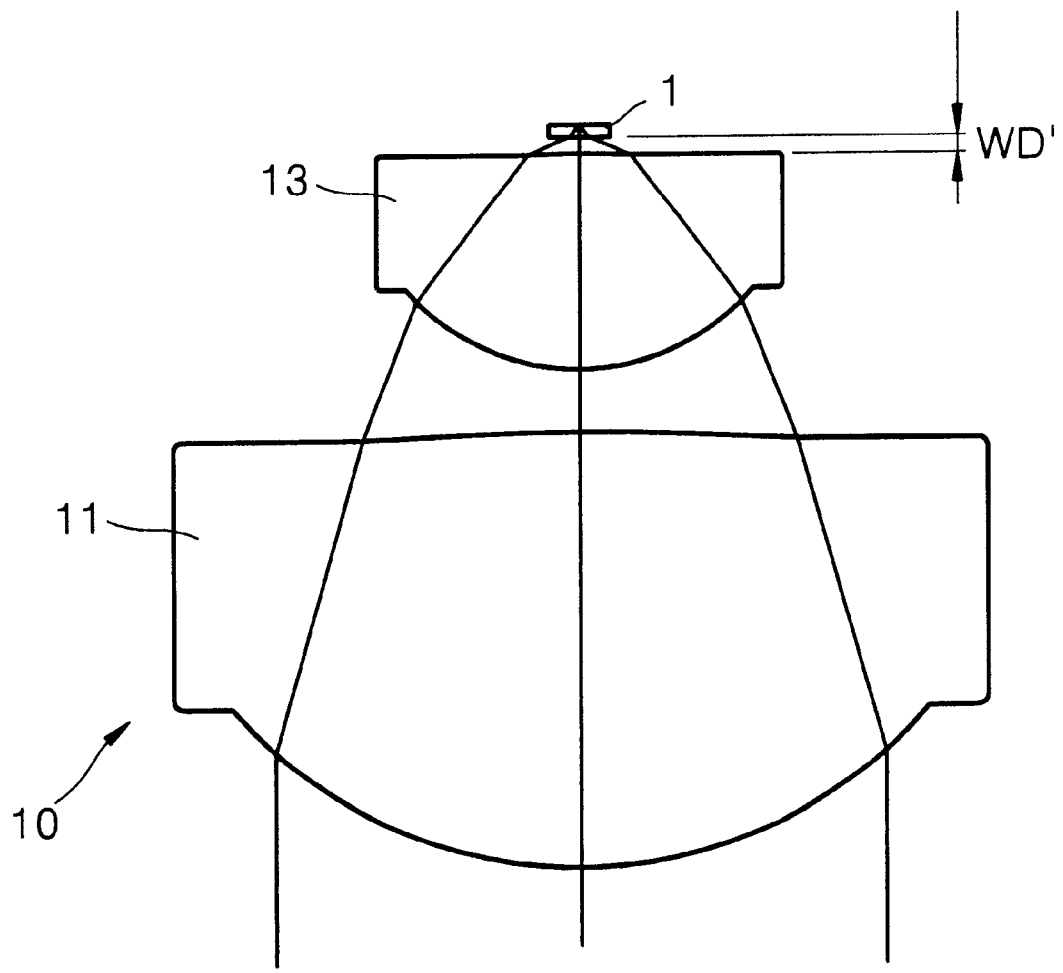
FIG. 1 is a view illustrating an example of a conventional objective lens formed of two lenses.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
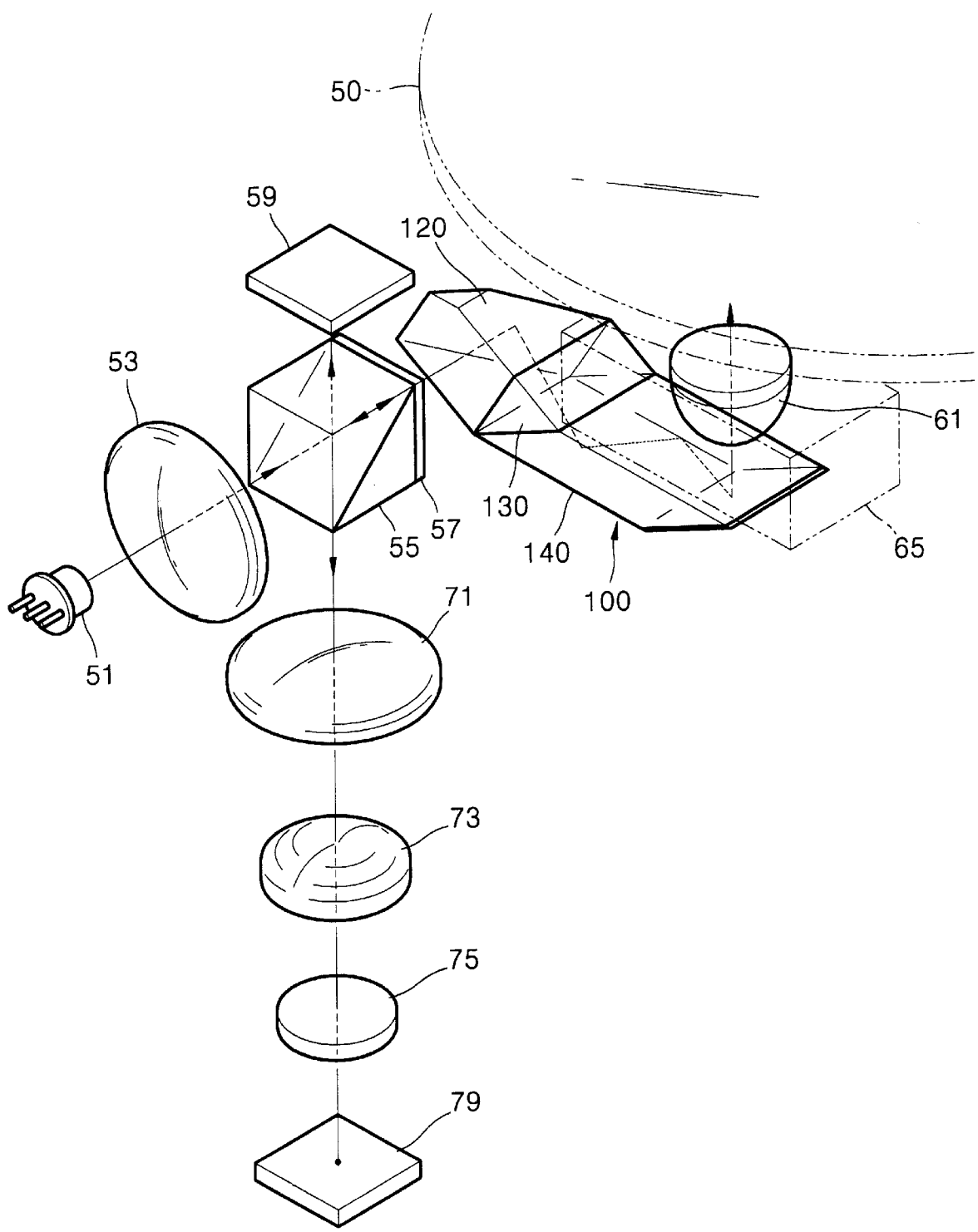
FIG. 2 is a perspective view of an optical pickup apparatus adopting an objective lens according to an embodiment of the present invention.
Figure 3:
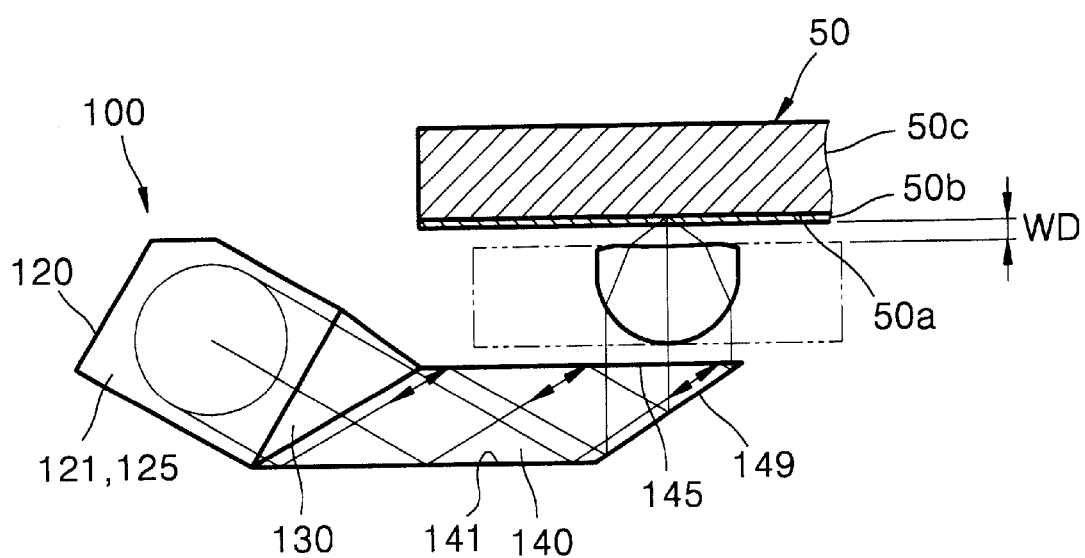
FIG. 3 is a front view illustrating major portions of the optical pickup apparatus of FIG. 2.

Referring to FIGS. 2 and 3, an optical pickup apparatus according to an embodiment of the present invention comprises a light source 51 to generate and emit a light beam having a predetermined wavelength, an objective lens 61 to form a light spot on a recording surface 50a of a recording medium 50 by condensing an incident light beam emitted from the light source 51, and a photodetector 79 to receive a light beam reflected by the recording surface 50a of a recording medium 50 and to perform photoelectric conversion of the received light beam.

The light source 51 comprises a semiconductor laser to emit a light beam having a predetermined wavelength, for example, 780 nm, 650 nm, or a blue wavelength, for example, 405 nm, according to an embodiment of the invention.

The objective lens 61 is formed of a single lens. The objective lens 61 is configured to have a WD (working distance) smaller than a thickness at the center of the objective lens 61 so that the objective lens can have a WD as short as possible to provide a thin optical pickup apparatus. Preferably, the objective lens 61 satisfies a condition that the thickness at the center of the objective lens 61 is 0.8 times or more than an effective diameter of the objective lens 61. Also, the objective lens 61 preferably has a WD satisfying the Inequality 4 below when an NA of the objective lens 61 is 0.8 or more (0.8≦NA). Here, the WD is a distance between a surface of the objective lens 61 and a light incident surface (generally a surface of a photodetective layer 50b) of the recording medium 50. Of course, the objective lens 61 can be applied to a system needing a compact optical system having a high magnification. In this case, the WD is a distance between a surface of the objective lens and a surface of an object (a focal plane).
Inequality 4

$$WD \leq \alpha BW - 0.2T$$

Here, "WD" is a working distance, "BW" is a diameter of an incident light beam, "T" is a thickness at the center of the lens, $\alpha=1/(2\tan\theta)$, and $\theta=\text{Arcsin}(NA)$.

An embodiment of the present invention provides that the objective lens 61 has an NA of 0.6 or more, in particular, 0.8 or more. The objective lens 61 has an effective diameter of 1.5 mm or less, and preferably, is formed of a material having a refractive index of 1.8 or more. Both surfaces of the objective lens 61 are preferably formed as aspheric surfaces to remove optical aberration and increase decenter between lens surfaces. Also, the maximum slope angle of the objective lens 61 is less than 55°, preferably, between 50–55°, considering the difficulty in manufacture.

Figure 4:
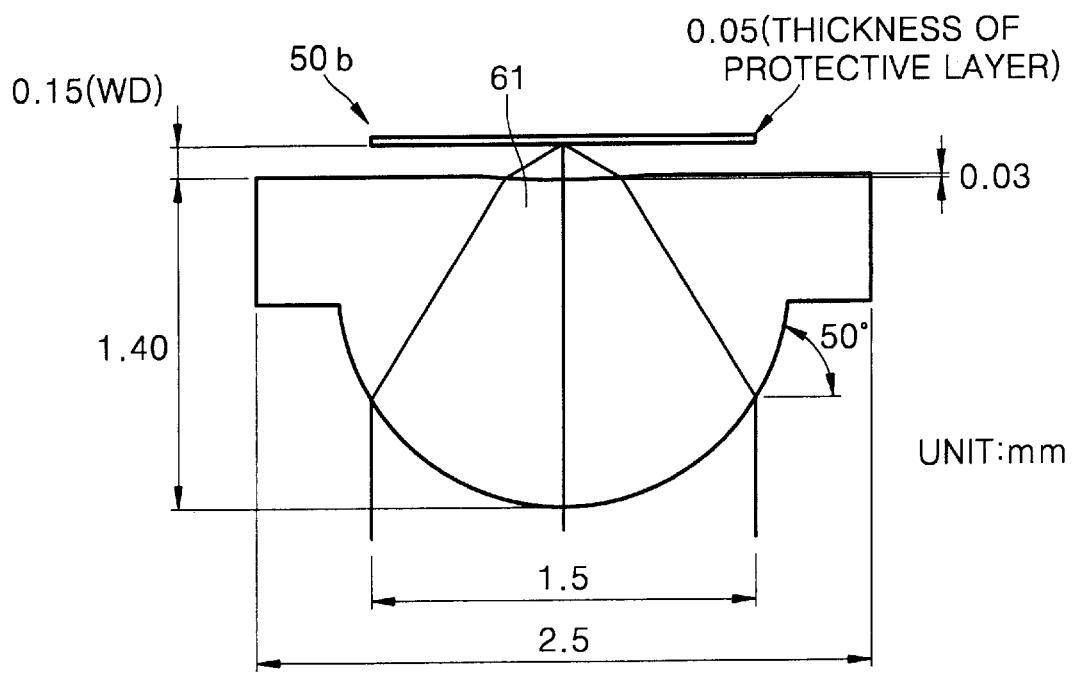
FIG. 4 is a view illustrating an example of a design of the objective lens of an embodiment of the present invention.

The objective lens 61 according to the present invention, as illustrated in FIG. 4, is optimized at a WD of 0.15 mm when NA=0.86, T=1.4 mm, and BW=1.5 mm. Here, the maximum slope angle of a surface of the objective lens 61 is 51°.

Table 1 shows an example of data in the design of a first aspheric surface of the objective lens 61 on which the light beam emitted from the light source 51 is incident and a second aspheric surface of the objective lens 61 from which the light beam exits. The data of Table 1 are values from a design in which a glass material having a refractive index of 1.92288 to a wavelength of 650 nm and an aspheric surface by an odd function are used.

Figure 5:
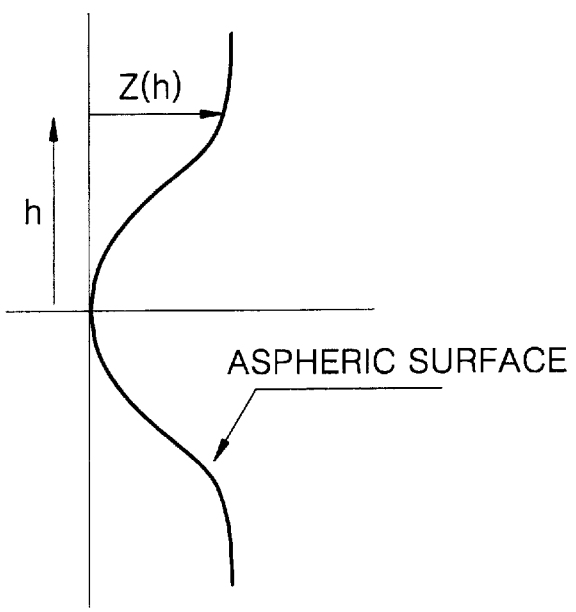
FIG. 5 illustrates a function with respect to an aspheric surface.

As illustrated in FIG. 5, a function with respect to the first and second aspheric surfaces can be expressed by Equation 5.

$$z = \frac{\frac{h^2}{R}}{1+\sqrt{1-(1+K)\frac{h^2}{R^2}}} + \sum_j A_j h^j \quad \{\text{Equation 5}\}$$

Here, "Z(h)" is a depth from an apex of an aspheric surface, "h" is a height from an optical axis, and "R" is a radius of curvature.

Figure 6:
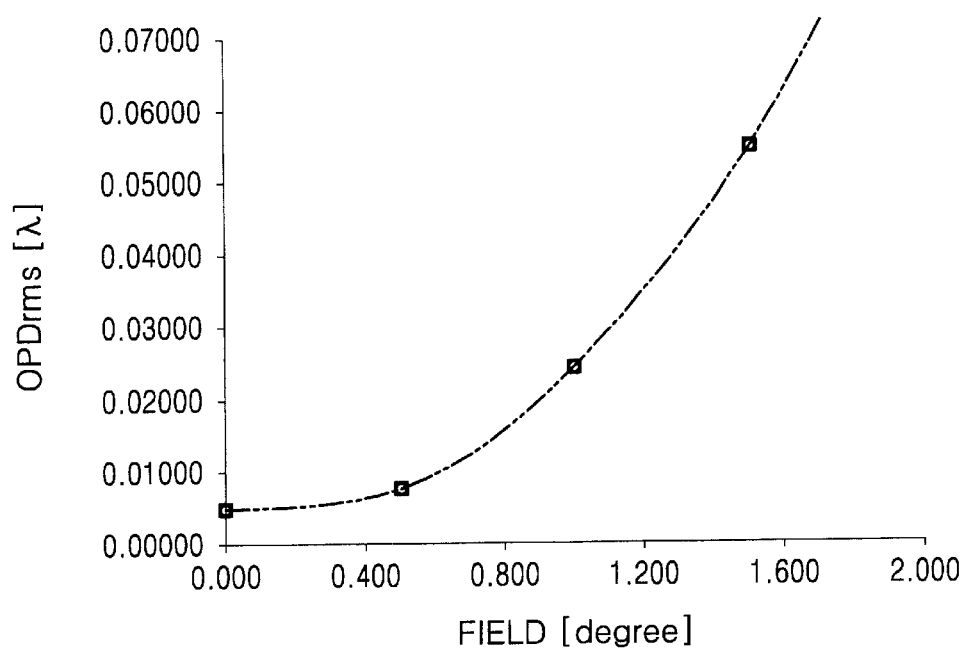
FIG. 6 is a graph illustrating an incident field aberration feature of the objective lens according to an embodiment of the present invention.

FIG. 6 illustrates a feature of incident field aberration of the objective lens 61 according to an embodiment of the present invention. As can be seen from FIG. 6, the objective lens 61 maintains an aberration of 0.06λ rms or less with respect to an incident field angle of 1.5°.

Figure 7:
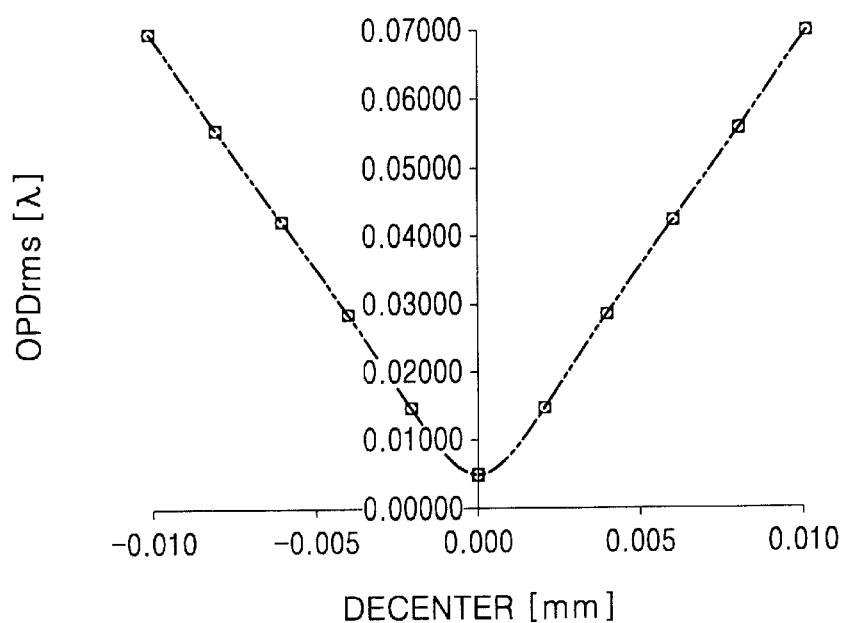
FIG. 7 is a graph illustrating an aberration feature according to decenter of the objective lens of an embodiment of the present invention.

FIG. 7 illustrates a feature of aberration according to decenter of the objective lens 61 of an embodiment of the present invention. As can be seen from FIG. 7, the objective lens 61 according to the present invention indicates an aberration of 0.035λ rms at decenter of ±5 μm.

Figure 8:
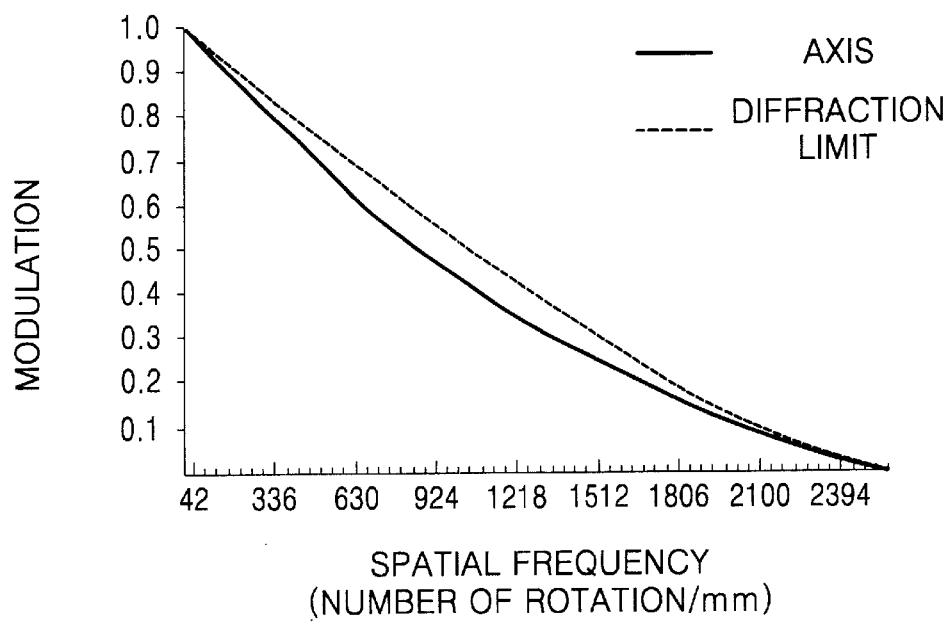
FIG. 8 is a graph illustrating a modulation transfer function (MTF) feature at a defocus of 0.3 μm of the objective lens of an embodiment of the present invention.

FIG. 8 illustrates a modulation transfer function (MTF) feature at a defocus of 0.3 μm of the objective lens 61 according to an embodiment of the present invention, in which an output signal with respect to an input signal is expressed by a signal amplitude function of a spatial frequency considering the objective lens, that is, an optical system, as a transfer function. In general, as illustrated in FIG. 8 by a dotted line, when an input signal is a sinusoidal wave, there is almost no change in amplitude of a signal for a low frequency. However, for a high frequency, the amplitude of a signal changes drastically by a diffraction limit (a dotted line). Thus, a lens having a superior aberration feature is close to the diffraction limit. In the case of the objective lens 61, a change in the amplitude of a signal with respect to a high frequency is close to the diffraction limit, as indicated by a solid line of FIG. 8. That is, the objective lens 61 of the present invention exhibits a superior aberration feature.

Figure 9:
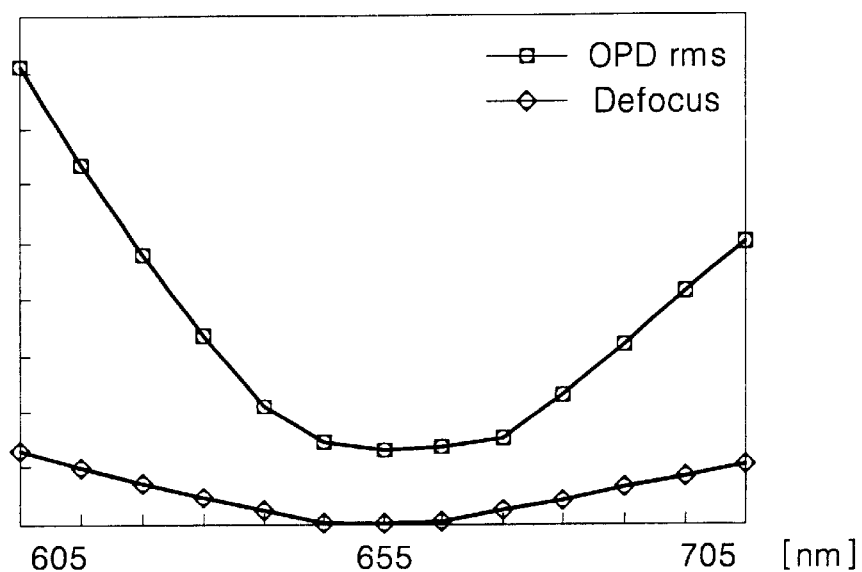
FIG. 9 is a graph illustrating an OPD (optical path difference) and a defocus value according to a change in wavelength of the objective lens of an embodiment of the present invention.

FIG. 9 illustrates a defocus according to a change in wavelength of the objective lens 61 according to the present invention and an OPD (optical path difference) according to the defocus. Referring to FIG. 9, while in a typical DVD objective lens defocus is allowed to an amount of about ½ of a depth of focus with respect to a wavelength change amount of ±2 nm, the objective lens of the present invention,

| Surface | Radius of curvature (mm) | | |
| --- | --- | --- | --- |
| Aspheric surface 1 | 0.8055 | | |
| | K = −0.697423 | | |
| | A1 = 0.823886E−01 | A2 = 0.495811E−01 | A3 = 0.790679E−01 |
| | A4 = 0.124781E+01 | A5 = −0.647190E+01 | A6 = 0.172477E+02 |
| | A7 = −0.238351E+02 | A8 = 0.143298E+02 | A9 = −0.260214E+01 |
| Aspheric surface 2 | −0.31853 | | |
| | K = −0.769675E+20 | | |
| | A1 = 0.525921E+01 | A2 = −0.111088E+03 | A3 = 0.932496E+03 |
| | A4 = −0.296183E+04 | A5 = −0.156004E−04 | A6 = −0.767350E−05 |
| | A7 = −0.273314E−05 | A8 = −0.756518E−06 | A9 = 0.708817E−09 |

In Table 1, "K" is a conic constant of each of the first and second aspheric surfaces, and "A1"–"A9" are aspheric coefficients.

which allows an aberration change amount of 0.001λ rms, satisfies the condition.

As can be seen from FIGS. 6 through 9, an amount of defocus of the objective lens 61 is 0.180 μm with respect to a wavelength change amount of ±2 nm. Given that a wavelength is 650 nm, an NA is 0.85, and a depth of focus is δ~0.45 μm, the amount of defocus of 0.180 μm corresponds to 0.40δ. Also, with respect to aberration that OPD= 0.035λ rms, an allowance of a thickness of the objective lens 61 is 9 μm and a tilt between the front surface and the rear surface of the objective lens 61 is 4 arcmin, which satisfy a condition of allowance in manufacturing a typical objective lens for a DVD. Here, although the allowance in manufacturing an objective lens for a DVD is determined by a manufacturer, with respect to slope angle<55° and OPD= 0.03λ rms, conditions that decenter>4 μm and tilt>2 arcmin are substantially used in design.

As can be seen from FIGS. 6 through 9, according to the present invention, providing an objective lens formed of a single lens and having a high NA, for example, 0.8 or more, while satisfying an allowance condition of optical aberration, can be obtained. Also, according to the present invention, an objective lens having a lens surface of which the maximum slope angle is less than 55° with respect to a high NA of 0.7 or more, for example, the maximum slope angle is 51° with respect to an NA of 0.85, can be obtained.

The objective lens 61 according to the present invention is controlled by an actuator 65 in focusing and tracking directions. Since the basic structure of the actuator 65 is well known in the field to which the present invention pertains, a detailed description and drawings will be omitted.

Referring back to FIG. 2, in the optical pickup apparatus according to an embodiment of the present invention, the objective lens 61 is disposed in a direction of height at a position substantially perpendicular to a plane where the light source 51 and the photodetector 79 are arranged, and simultaneously, a reflection type compound prism 100 is provided to make the optical pickup apparatus thinner.

The reflection type compound prism 100 makes an incident light beam emitted from the light source 51 proceed by reducing the size of the light beam in the direction of height by using a difference in angle between surfaces of a plurality of prisms, and the light beam reflected by a surface forming an angle less than 45° with respect to a horizontal plane which is perpendicular to the direction of height, so as to proceed toward the objective lens 61 disposed in the direction of height. The reflection type compound prism 100 is preferably optimized such that the size of the light beam proceeding toward the objective lens 61 after passing the reflection type compound prism 100 is the same as or greater than that of the light beam which the light beam emitted from the light source 51 and is incident on the reflection type compound prism 100, and simultaneously, that the thickness of the optical pickup apparatus can be minimized. The reflection type compound prism 100 is disclosed in Korea Patent Application No. 2001-23343 filed by the present applicant on Apr. 30, 2001 entitled "Reflection Type Compound Prism and Optical Pickup Apparatus Adopting the Same" and a corresponding U.S. application, the disclosures of which are incorporated herein by reference (Attorney Docket No. 1293.1311). Thus, detailed descriptions of the structure and function of the reflection type compound prism 100, which can be seen by referring to Korea Patent Application No. 2001-23343 and a corresponding U.S. application (Attorney Docket No. 1293.1311), will be omitted and only a practical example will be described.

Figure 10:
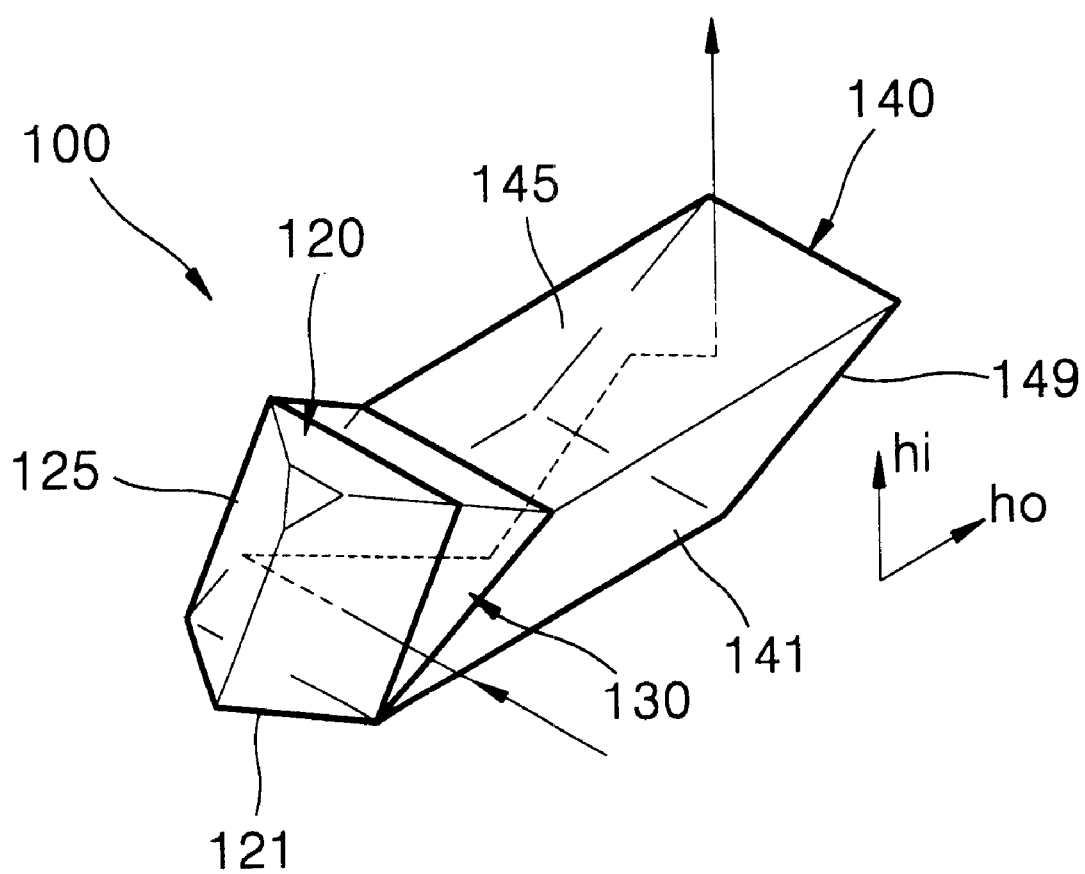
FIG. 10 is a perspective view illustrating a reflection type compound prism of the optical pickup apparatus of FIG. 2.

Referring to FIG. 10, the reflection type compound prism 100, for example, includes a first triangle prism 120 in which a three sided surface contributing to procession of a light beam forms an isosceles triangle structure, a rhomboid prism 140 in which four surfaces contribute to the procession of the light beam and forms a rhomboid structure. The rhomboid prism 140 is arranged to be inclined with respect to the first triangle prism 120. A second triangle prism 130 having a right-angled triangle is installed between the first triangle prism 120 and the rhomboid prism 140.

Given that a direction of an optical axis of the objective lens 61 i.e., the height direction of the optical pickup apparatus is hi and a parallel direction with respect to a horizontal plane perpendicular to the height direction hi is ho, the first triangle prism 120 includes a first transmission surface 121 on which a light beam emitted from the light source 51 is incident, and a first reflection surface 125 by which the light beam passing the first transmission surface 121 is reflected to be inclined downward with respect to the horizontal plane. Here, the first triangle prism 120 is preferably formed to be right-angled isosceles, for example, so that the light beam incident on the first reflection surface 125 is totally internally reflected.

The rhomboid prism 140 includes a second reflection surface 141 on which the light beam, totally internally reflected by the first reflection surface 125 to be inclined downward and input to the inside of the rhomboid prism 140, is totally internally reflected to be inclined upward. A third reflection surface 145 is arranged above the second reflection surface 141 in the height direction hi such that the size of the light beam in the height direction hi is reduced and by which the light beam reflected from the second reflection surface 141 is totally internally reflected. A fourth reflection surface 149 on which an incident light beam reflected from the third reflection surface 145 is reflected in the height direction hi. Here, the distance between the second and third reflection surfaces 141 and 145 facing each other in the height direction hi is preferably less than the diameter of the incident light beam on the first transmission surface 121 of the first triangle prism 120. By reducing the distance between the second and the third reflection surfaces 141 and 145, the size of the light beam in the height direction hi is reduced so that waveguiding of the light beam parallel to the horizontal plane is possible. The fourth reflection surface 149 makes an angle of less than 45°, preferably, 20–40°, for example, 30°, with respect to the horizontal plane. Also, since the fourth reflection surface 149 does not satisfy a condition of total internal reflection with respect to an incident light beam, it is preferably coated to be able to total reflect the incident light beam.

The second triangle prism 130 makes the light beam reflected by the first reflection surface 125 of the first triangle prism 120 to be inclined downward proceed straight so as to be input to the inside of the rhomboid prism 140.

The reflection type compound prism 100 having the above structure 100 is preferably arranged such that the light beam emitted from the light source 51 proceeds as the size of the light beam in the height direction hi under the actuator 65 is reduced by using a difference of angle between surfaces of the first triangle prism 120 and the rhomboid prism 140, and is reflected to proceed toward the objective lens 61 disposed in the height direction hi.

That is, the reflection type compound prism 100 has a structure to reduce the size of the incident light beam in the height direction hi between the second and third reflection surfaces 141 and 145 of the rhomboid prism 140, and the first triangle prism 120 of the reflection type compound prism 100 protrudes higher than the rhomboid prism 140 in view of the height direction hi. Thus, to form a thinner optical pickup apparatus, the reflection type compound prism 100, in particular, a portion corresponding to the third reflection surface 145 of the rhomboid prism 140, is preferably arranged under the actuator 65 and the actuator 65 is formed so that the above arrangement can be available.

When the rhomboid prism 140 is arranged as above, since at least part of the objective lens 61 can be positioned lower than the light beam emitted from the light source 51 and being incident on the reflection type compound prism 100, an effective thickness of the reflection type compound prism 100 affecting the overall thickness of the optical pickup apparatus is substantially the distance between the second and third reflection surfaces 141 and 145.

Here, considering that the diameter of the light beam emitted from the reflection type compound prism 100 toward the objective lens 61 is substantially the same as or greater than that of the light beam incident on the reflection type compound prism 100, the optical thickness of the rhomboid prism 140 of the optimal reflection type compound prism 100 depends on an angle of the fourth reflection surface 149 with respect to the horizontal plane. Thus, the thickness of the optical pickup apparatus in the height direction hi can be reduced by decreasing the angle formed by the fourth reflection surface 149 and the horizontal plane ho.

When the above reflection type compound prism 100 is adopted, the light beam having a relatively large diameter, which is emitted from the light source 51 and incident on the reflection type compound prism 100, passes under the actuator 65 while the diameter of the light beam is horizontally directed along the length of the rhomboid prism 140 at a reduced width. The light beam is reflected by the fourth reflection surface 149 of the rhomboid prism 140 and the diameter of the light beam is restored to the original size.

The optical pickup apparatus according to the present invention includes an optical path changer 55 disposed on the optical path between the light source 51 and the reflection type compound prism 100 to change a proceeding path of the light beam. The optical path changer 55, as shown in FIG. 2, may include a polarizing beam splitter to transmit or reflect an incident light beam according to a polarization component thereof, and a wave plate 57 to change polarization of the incident light beam. The wave plate 57 according to an embodiment of the present invention is a ¼ wave plate with respect to a wavelength of the light beam emitted from the light source 51. A beam splitter to transmit and reflect a light beam in a predetermined ratio can be used as the optical path changer 55.

The optical pickup apparatus according to the present invention further includes a collimating lens 53 to convert a divergent light beam emitted from the light source 51 into a parallel light beam which is provided on the optical path between the light source 51 and the reflection type compound prism 100. When the collimating lens 53 and the beam splitter type optical path changer are provided as shown in FIG. 2, an embodiment of the present invention provides that a condensing lens 71 to condense the light beam reflected by the recording medium 50 and sequentially passing the objective lens 61, the reflection type compound prism 100, and the optical path changer to proceed toward the photodetector 79 are provided on the optical path between the optical path changer and the photodetector 79. Also, an astigmatism lens unit is further provided on the optical path between the optical path changer and the photodetector 79 so that a focus error signal is detected by an astigmatism method. The astigmatism lens unit includes a cylindrical lens 73 to generate astigmatism to an incident light beam and a yoke lens 75 to slightly diverge an incident light beam.

In FIG. 2, reference numeral 59 denotes a monitoring photodetector to monitor a quantity of light emitted from the light source 51.

In the above-described optical pickup apparatus, a light beam having a predetermined diameter is emitted from the light source 51, passes the collimating lens 53 and the optical path changer to be approximately perpendicularly incident on the first transmission surface 121 of the first triangle prism 120 of the reflection type compound prism 100. The light beam is totally internally reflected by the first reflection surface 125 of the first triangle prism 120 and proceeds to be inclined downward with respect to the horizontal plane. Then, the light beam is incident on the second reflection surface 141 of the rhomboid prism 140 at an angle satisfying a condition of total internal reflection. The diameter of the light beam increases as the light beam is totally internally reflected. The light beam is totally internally reflected by the third reflection surface 145 of the rhomboid prism 140 disposed closer to the diameter of the light beam incident on the first transmission surface 121. The reflected light beam proceeds toward the fourth reflection surface 149 of the rhomboid prism 140 which is coated to totally reflect the incident light beam. The light beam guided from the first triangle prism 120 toward the rhomboid prism 140 is guided parallel to the horizontal plane until it meets the fourth reflection surface 149 while the diameter of the light beam increases and the size of the light beam in the direction of height hi decreases due to a geometric structure of the rhomboid prism 140 and an arrangement structure of the first triangle prism 120 and the rhomboid prism 140. The light beam incident on the fourth reflection surface 149 forming an angle less than 45° with respect to the horizontal plane is reflected thereby and proceeds toward the objective lens 61 with a diameter thereof restored to the original or a greater than the original diameter.

The light beam incident on the objective lens 61 is focused by the objective lens 61 to form a light spot on the recording surface 50a of the recording medium 50. The light beam reflected by the recording surface 50a of the recording medium 50 is incident on the optical path changer after passing the objective lens 61 and the reflection type compound prism 100 along an optical path opposite to the above-described optical path, and is reflected by the polarizing beam splitter 55 of the optical path changer. The reflected light beam passes the condensing lens 71 and the astigmatism lenses 73 and 75 and is received by the photodetector 79.

In the above description, the optical pickup apparatus according to the present invention includes the reflection type compound prisms 100 to make the incident light beam totally internally reflected by the first reflection surface 125 of the first triangle prism 120 and the prism type optical path changer. However, the prism type optical path changer can be omitted by configuring the reflection type compound prism 100 such that the incident light beam on the first reflection surface 125 is transmitted and reflected in a predetermined ratio and arranging the photodetector 79 and/or the monitoring photodetector 59 such that the light beam transmitting the first reflection surface 125 is detected.

Also, the optical pickup apparatus according to the present invention may use a hologram optical element (not shown) instead of the beam splitter type optical path changer. When the hologram optical element is used as the optical path changer, the light source 51, the hologram optical element, and the photodetector 79 can be formed as an optical module. Here, the hologram optical element can be formed such that the incident light beam emitted from the light source 51 is passed straight and the incident light beam reflected by the recording medium 50 is made to diffract and proceed toward the photodetector 79 arranged at one side of the light source 51. As the optical module is a well-known technology in the present field, a detailed description and illustration will be omitted. When the optical pickup apparatus according to the present invention adopts the optical module, a more compact optical pickup apparatus can be formed with respect to the optical pickup apparatus having the optical structure as shown in FIG. 2.

The above optical pickup apparatus according to the present invention can be formed thin by adopting the objective lens 61 having a short working distance according to the present invention. Also, the optical pickup apparatus according to the present invention can record and/or reproduce data to/from a recording medium in a first reflection surface recording method since the working distance of the objective lens 61 is short. Here, the first reflection surface recording method is applied to the recording medium 50 having no typical protective layer, that is, a light incident surface is just the recording surface 50$a$ or a protective film 50$b$ which is thin, for example, 40 nm through 100 μm, formed on the recording surface 50$a$ to protect the recording surface 50$a$ formed on a substrate 50$c$ from dusts or scratches. Thus, since the working distance of the objective lens 61 can be made short as much as the thickness of a typical protective layer (for example, a thickness of 0.6 mm of a substrate in a DVD), a thin optical pickup apparatus can be configured.

In the above description, the objective lens 61 according to the present invention is adopted in the optical pickup apparatus described with reference to FIG. 2 so that the optical pickup apparatus can be made thin. However, the objective lens 61 according to the present invention can be adopted in any optical system needing a short working distance in addition to the optical pickup apparatus.

Also, the optical configuration of the optical pickup apparatus according to the present invention is not limited to the configuration shown in FIG. 3 and can be modified in various ways.

Since the objective lens 61 formed of a single lens according to the present invention is configured such that the maximum slope angle of a lens surface is less than 55° with respect to a high NA of 0.7 or more, unlike a conventional objective lens formed of a single lens, the objective lens 61 can be manufactured to satisfy a condition of allowance in optical aberration and have a high NA of 0.7 or more. Accordingly, productivity and yield in manufacture are superior. Also, the structure of the objective lens 61 formed of a single lens according to the present invention is simple compared to a conventional objective lens formed of two lenses.

Thus, the optical pickup apparatus adopting the objective lens of the present invention can be used for high density recording and reproduction with reduced volume, simpler structure, and/or low price compared to a conventional device. Also, since the optical pickup apparatus adopting the objective lens of the present invention has a very short working distance, the first reflection surface recording method can be adopted. Accordingly, the thickness of the optical pickup apparatus can be manufactured to be as thin as a protective layer of a typical recording medium. Also, when the optical pickup apparatus adopting the objective lens of the present invention includes a reflection type compound prism, the optical pickup apparatus can be manufactured to be thinner.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An objective lens comprising:
  a single lens, wherein a working distance between said lens and a focal point of said objective lens is less than a thickness at the center of said lens,
  wherein the thickness at the center of the lens is 0.8 times or more an effective diameter of said lens.

2. The objective lens according to claim 1, wherein, when an NA of said lens is 0.8 or more, the working distance (WD) of said lens satisfies the Inequality $$WD \leq \alpha BW - 0.2T,$$

wherein WD is the working distance, BW is a diameter of an incident light beam, T is the thickness at the center of said lens, $\alpha = 1/(2 \tan \theta)$, and $\theta = \text{Arcsin}(NA)$.

3. The objective lens according to claim 2, wherein the WD has a value of 0.15 mm, the NA has a value of 0.86, the T has a value of 1.4 mm and the BW has a value of 1.5 mm.

4. The objective lens according to claim 1, wherein an NA of said lens is 0.8 or more.

5. The objective lens according to claim 1, wherein said lens has two aspheric surfaces.

6. The objective lens according to claim 1, wherein said lens has an effective diameter of 1.5 mm or less.

7. The objective lens according to claim 1, wherein said lens comprises a material having a refractive index of 1.8 or more.

8. An objective lens comprising:
  a single lens, wherein a working distance between said lens and a focal point of said objective lens is less than a thickness at the center of said lens, and wherein when an NA of said lens is 0.8 or more, the working distance of said lens satisfies the Inequality $$WD \leq \alpha BW - 0.2T,$$

wherein WD is the working distance, BW is a diameter of an incident light beam, T is the thickness at the center of said lens, $\alpha = 1/(2 \tan \theta)$, and $\theta = \text{Arcsin}(NA)$.

9. An objective lens comprising:
  a single lens, wherein a working distance between said lens and a focal point of said objective lens is less than a thickness at the center of said lens, and wherein a maximum slope angle of a surface of said lens on which a light beam is incident is between 50° and 55°.

10. An objective lens formed of a single lens, wherein a thickness at the center of the lens is 0.8 times or more an effective diameter of the lens.

11. The objective lens according to claim 10, wherein an NA of said lens is 0.8 or more.

12. The objective lens according to claim 10, wherein, when an NA of said lens is 0.8 or more, the working distance of said lens satisfies the Inequality $$WD \leq \alpha BW - 0.2T,$$

wherein WD is the working distance, BW is a diameter of an incident light beam, T is the thickness at the center of said lens, $\alpha = 1/(2 \tan \theta)$, and $\theta = \text{Arcsin}(NA)$.

13. The objective lens according to claim 10, wherein said lens has two aspheric surfaces.

14. The objective lens according to claim 10, wherein said lens has an effective diameter of 1.5 mm or less.

15. The objective lens according to claim 10, wherein said lens comprises a material having a refractive index of 1.8 or more.

16. The objective lens according to claim 10, wherein a maximum slope angle of a surface of said lens on which a light beam is incident is between 50° and 55°.

17. An optical pickup apparatus comprising:
a light source to generate and emit a light beam having a predetermined wavelength;
an objective lens to focus the light beam emitted from said light source to form a light spot on a recording surface of a recording medium; and
a photodetector to receive the light beam reflected by the recording surface of the recording medium,
wherein said objective lens is formed of a single lens such that a working distance between said objective lens and the recording surface is less than a thickness at the center of said objective lens, and
wherein a thickness at the center of said objective lens is 0.8 times or more an effective diameter of said objective lens.

18. The optical pickup apparatus according to claim 17, wherein, when an NA of said objective lens is 0.8 or more, the working distance of said objective lens satisfies the Inequality $$WD \leq \alpha BW - 0.2T,$$

wherein WD is the working distance, BW is a diameter of an incident light beam, T is the thickness at the center of said objective lens, $\alpha = 1/(2 \tan \theta)$, and $\theta = \mathrm{Arcsin}$ (NA).

19. The optical pickup apparatus according to claim 17, wherein said objective lens has an NA of 0.8 or more.

20. The optical pickup apparatus according to claim 17, wherein siad objective lens has an effective diameter of 1.5 mm or less.

21. The optical pickup apparatus according to claim 17, wherein said objective lens comprises a material having a refractive index of 1.8 or more.

22. The optical pickup apparatus according to claim 17, wherein said objective lens has two aspheric surfaces.

23. The optical pickup apparatus according to claim 17, wherein the recording medium has a structure adopting a first reflection surface recording method.

24. The optical pickup apparatus according to claim 23, wherein a protective layer of the recording medium has a thickness in a range of 40 nm–100 μm.

25. The optical pickup apparatus according to claim 23, further comprising a reflection type compound prism formed of a plurality of prisms to make an incident light beam emitted from said light source proceed by reducing a size of the light beam in a direction of height towards said objective lens by using a difference in angle between surfaces of the prisms, and the light beam reflected by a surface forming an angle less than 45° with respect to a horizontal plane which is perpendicular to the direction of height, so as to proceed toward said objective lens disposed in the direction of height.

26. The optical pickup apparatus according to claim 25, wherein at least part of said objective lens is disposed to be further from the recording medium than a location from which the light beam is emitted from said light source and incident on the reflection type compound prism.

27. The optical pickup apparatus according to claim 25, further comprising:
a collimating lens to convert a divergent light beam emitted from said light source into a parallel light beam provided on an optical path between said light source and said reflection type compound prism;
an optical path changer positioned between said collimating lens and said reflection type compound prism; and
a condensing lens to condense the light beam reflected by the recording medium and sequentially passing said objective lens, said reflection type compound prism, and said optical path changer to proceed toward said photodetector.

28. The optical pickup apparatus according to claim 27, further comprising:
an astigmatism lens unit provided on an optical path between said optical path changer and said photodetector to detect a focus error signal.

29. The optical pickup apparatus according to claim 28, wherein said astigmatism lens unit comprises:
a cylindrical lens to generate an astigmatism to an incident light beam; and
a yoke lens to slightly diverge the incident light beam.

30. The optical pickup apparatus according to claim 27, wherein said optical path changer comprises a polarizing beam splitter.

31. An optical pickup apparatus comprising:
a light source to generate and emit a light beam having a predetermined wavelength;
an objective lens to focus the light beam emitted from said light source to form a light spot on a recording surface of a recording medium; and
a photodetector to receive the light beam reflected by the recording surface of the recording medium,
wherein said objective lens is formed of a single lens and a working distance between said objective lens and the recording surface is less than a thickness at the center of said objective lens, and
wherein when an NA of said objective lens is 0.8 or more, a working distance of said objective lens satisfies the Inequality $$WD \leq \alpha BW - 0.2T,$$

wherein WD is the working distance, BW is a diameter of an incident light beam, T is the thickness at the center of said objective lens, $\alpha = 1/(2 \tan \theta)$, and $\theta = \mathrm{Arcsin}$ (NA).

32. An optical pickup apparatus comprising:
a light source to generate and emit a light beam having a predetermined wavelength;
an objective lens to focus the light beam emitted from said light source to form a light spot on a recording surface of a recording medium; and
a photodetector to receive the light beam reflected by the recording surface of the recording medium,
wherein said objective lens is formed of a single lens and a working distance between said objective lens and the recording surface is less than a thickness at the center of said objective lens, and
wherein a maximum slope angle of a surface of said objective lens on which light is incident is between 50° and 55°.

33. An optical pickup apparatus comprising:
a light source to generate and emit a light beam having a predetermined wavelength;
an objective lens to focus the light beam emitted from said light source to form a light spot on a recording surface of a recording medium;

a photodetector to receive the light beam reflected by the recording surface of the recording medium, and a reflection type compound prism formed of a plurality of prisms to make an incident light beam emitted from said light source proceed by reducing a size of the light beam in a direction of height towards said objective lens by using a difference in angle between surfaces of the prisms, and the light beam reflected by a surface forming an angle less than 45° with respect to a horizontal plane which is perpendicular to the direction of height, so as to proceed toward said objective lens disposed in the direction of height, wherein said objective lens is formed of a single lens and a working distance between said objective lens and the recording surface is less than a thickness at the center of said objective lens.

34. The optical pickup apparatus according to claim 33, wherein at least part of said objective lens is disposed to be further from the recording medium than a location from which the light beam is emitted from said light source and incident on said reflection type compound prism.

35. An optical pickup apparatus comprising:

a light source to generate and emit a light beam having a predetermined wavelength;

an objective lens to focus the light beam emitted from said light source to form a light spot on a recording surface of a recording medium; and a photodetector to receive the light beam reflected by the recording surface of the recording medium, wherein said objective lens is formed of a single lens and a thickness at the center of said objective lens is 0.8 times or more an effective diameter of said objective lens.

36. The optical pickup apparatus according to claim 35, wherein the objective lens has an NA of 0.8 or more.

37. The optical pickup apparatus according to claim 35, wherein, when an NA of said objective lens is 0.8 or more, a working distance of said objective lens satisfies the Inequality $$WD \leq \alpha BW - 0.2T,$$

wherein WD is the working distance, BW is a diameter of an incident light beam, T is the thickness at the center of said objective lens, $\alpha = 1/(2 \tan \theta)$, and $\theta = \text{Arcsin (NA)}$.

38. The optical pickup apparatus according to claim 35, wherein said objective lens has two aspheric surfaces.

39. The optical pickup apparatus according to claim 35, wherein said objective lens has an effective diameter of 1.5 mm or less.

40. The optical pickup apparatus according to claim 35, wherein said objective lens comprises a material having a refractive index of 1.8 or more.

41. The optical pickup apparatus according to claim 35, wherein a maximum slope angle of a surface of said objective lens on which light is incident is between 50° and 55°.

42. The optical pickup apparatus according to claim 35, wherein the recording medium has a structure adopting a first reflection surface recording method.

43. The optical pickup apparatus according to claim 42, wherein a protective layer of the recording medium has a thickness in a range of 40 nm–100 μm.

44. The optical pickup apparatus according to claim 42, further comprising a reflection type compound prism formed of a plurality of prisms to make an incident light beam emitted from said light source proceed by reducing a size of the light beam in a direction of height towards said objective lens by using a difference in angle between surfaces of the prisms, and the light beam reflected by a surface forming an angle less than 45° with respect to a horizontal plane which is perpendicular to the direction of height, so as to proceed toward said objective lens disposed in the direction of height.

45. The optical pickup apparatus according to claim 44, wherein at least part of said objective lens is disposed further from the recording medium than a location from which the light beam is emitted from said light source to be incident on the reflection type compound prism.

46. The optical pickup apparatus according to claim 35, further comprising a reflection type compound prism formed of a plurality of prisms to make an incident light beam emitted from said light source proceed by reducing a size of the light beam in a direction of height towards said objective lens by using a difference in angle between surfaces of the prisms, and the light beam reflected by a surface forming an angle less than 45° with respect to a horizontal plane which is perpendicular to the direction of height, so as to proceed toward said objective lens disposed in the direction of height.

47. The optical pickup apparatus according to claim 46, wherein at least part of said objective lens is disposed to be further from the recording medium than a location from which the light beam is emitted from said light source to be incident on said reflection type compound prism.

48. An objective lens comprising:

a single lens comprising a solid material having a NA greater than 0.7 and a maximum slope angle less than 55°.

* * * * *

UNITED STATES PATENT AND TRADEMARK OFFICE
CERTIFICATE OF CORRECTION

PATENT NO. : 6,650,469 B2
DATED : November 18, 2003
INVENTOR(S) : Dae-sik Kim et al.

It is certified that error appears in the above-identified patent and that said Letters Patent is hereby corrected as shown below:

Column 13,
Line 35, change "siad" to -- said --.

Signed and Sealed this

Second Day of March, 2004

JON W. DUDAS
*Acting Director of the United States Patent and Trademark Office*